United States Patent [19]
Balmford

[11] Patent Number: 5,174,523
[45] Date of Patent: Dec. 29, 1992

[54] COMPOUND HELICOPTER WITH ENGINE SHAFT POWER OUTPUT CONTROL

[75] Inventor: David E. H. Balmford, Sherborne, England

[73] Assignee: Westland Helicopters Limited, England

[21] Appl. No.: 895,166

[22] Filed: Jun. 5, 1992

Related U.S. Application Data

[63] Continuation of Ser. No. 745,842, Aug. 16, 1991, abandoned, which is a continuation-in-part of Ser. No. 461,975, Jan. 8, 1990, abandoned.

[30] Foreign Application Priority Data

Jan. 9, 1989 [GB] United Kingdom ............... 8900371

[51] Int. Cl.⁵ .................................................. B64C 27/22
[52] U.S. Cl. .................................. 244/17.11; 244/7 R; 244/17.21; 244/6; 244/17.19
[58] Field of Search ............... 244/6, 7 R, 17.19, 17.21

[56] References Cited

U.S. PATENT DOCUMENTS

| 3,138,349 | 6/1964 | Piasecki | 244/17.21 |
| 3,241,791 | 3/1966 | Piasecki | 244/17.19 |
| 3,448,946 | 6/1969 | Nagatsu | 244/17.19 |
| 3,540,680 | 11/1970 | Peterson | 244/17.19 |

FOREIGN PATENT DOCUMENTS 2130984  6/1984  United Kingdom ............... 244/7 R Primary Examiner—Joseph F. Peters, Jr.
Assistant Examiner—Anne E. Bidwell
Attorney, Agent, or Firm—Larson & Taylor

[57] ABSTRACT

A compound helicopter includes a main sustaining rotor for hover and low speed flight, a propeller for providing propulsion in high speed flight and an engine. Engine output power is controlled so as to ensure efficient use of available power in both modes of operation. A preferred form of control includes a variable area exhaust nozzle from a gas turbine engine which has the advantage also in providing an augmenting jet thrust during high speed flight.

1 Claim, 2 Drawing Sheets

COMPOUND HELICOPTER WITH ENGINE SHAFT POWER OUTPUT CONTROL

This application is a continuation of application Ser. No. 745,842 filed Aug. 16, 1991 which is a continuation-in-part of Ser. No. 461,975, filed Jan. 8, 1990, both now abandoned.

BACKGROUND OF THE INVENTION

1. Technical Field

This invention relates to compound helicopters.

2. Description of the Prior Art

A compound helicopter usually has a main sustaining rotor for hover and low speed flight, fixed wings to provide lift during high speed forward flight and usually, auxiliary propulsion means to provide additional thrust required for high speed forward flight.

GB-A-1095573, US-A-3138349 and US-A-3241791 all provide a compound helicopter having a rearward facing propeller at the end of a tail boom. The propeller is mounted in a duct and a plurality of vertical vanes in the propeller slipstream provide control surfaces to control forward flight direction and provide anti-torque control when hovering. There is no disclosure of any means or the desirability of varying the ratio of power applied during operation as between the main sustaining rotor and the propeller and it is likely therefore that the forward speed of the disclosed compound helicopter would be limited by the high tip mach number encountered by the advancing blades of the main sustaining rotor as forward speed increases and/or the modest power level which can be absorbed efficiently by the propeller.

Consequently, the installed power is sized for the maximum requirement in hover and may be under-utilised in high speed flight so that in that mode overall efficiency is adversely affected since the helicopter carries power output capacity that cannot be used to advantage in high speed flight.

GB-A-2130984 describes a compound helicopter having a variable cycle gas turbine power plant provided with a variable area final propulsion nozzle which receives the exhaust from a power turbine. In such an arrangement the power supplied to a main sustaining rotor can be reduced during high speed flight, and auxiliary propulsion means in the form of a jet thrust from the nozzle in forward flight is obtained. The jet nozzle may not be fuel efficient when operated in a continuous propulsion mode and, although the rotor may be slowed, rotor aerodynamic boundaries may again be reached as forward speed increases. The engine cannot be operated to provide jet thrust only and will always provide some shaft power output which is likely to be in excess of that required to drive the slowed sustaining rotor in high speed flight so that the available power capacity may again be under-utilised in that mode of operation. This again reduces the overall efficiency of the helicopter. Furthermore, the helicopter will require additional means such as a tail rotor to provide anti-torque forces. A tail rotor is operationally redundant in such an application during high speed flight and is detrimental to performance due to its high drag load and the fact that it consumes power.

An objective of this invention is to provide a compound helicopter capable of high forward speed. A further objective is to provide such a compound helicopter in which installed power is more fully utilised throughout all phases of operation than has been possible heretofore in order to increase the overall efficiency of operation.

SUMMARY OF THE INVENTION

Accordingly, this invention provides a compound helicopter comprising a fuselage with a rearwardly extending tail boom, a fixed wing extending from both sides of the fuselage, a main sustaining rotor located above the fuselage for rotation about a generally vertical axis, a rearwardly facing variable pitch propeller located in a duct at the end of the tail boom for rotation about a generally horizontal axis, a plurality of pivotally mounted vertical vanes downstream of the propeller and at least one variable cycle gas turbine engine wherein the exhaust from the power turbine is ducted to atmosphere through a variable area nozzle the engine being driven during operation at a constant speed to provide a substantially constant total power output comprising a shaft power output for driving the main sustaining rotor and the propeller through a gearbox and a jet thrust output through the variable area exhaust nozzle, whereby with the nozzle in a maximum area position the engine provides maximum shaft power output appropriate to drive the main sustaining rotor to provide lift and the propeller to provide an anti-torque force in hover and low speed flight and minimum jet thrust output from the exhaust nozzle and with the nozzle in a reduced area position and the main sustaining rotor substantially unloaded the engine provides a reduced shaft power output sufficient for control of the slowed rotor and for efficient operation of the propeller in high speed flight with the remainder of the total power output comprising an increased jet thrust output from the variable area nozzle for maximum propulsion in high speed flight, whereby the total power output from the engine is substantially fully utilised in both modes of operation.

BRIEF DESCRIPTION OF THE DRAWINGS

The invention will now be described by way of example only and with reference to the accompanying drawings in which, FIG. 1 comprises a generally schematic side view of a compound helicopter constructed according to one embodiment of the invention.

DETAILED DESCRIPTION OF THE DRAWINGS

Figure 1:
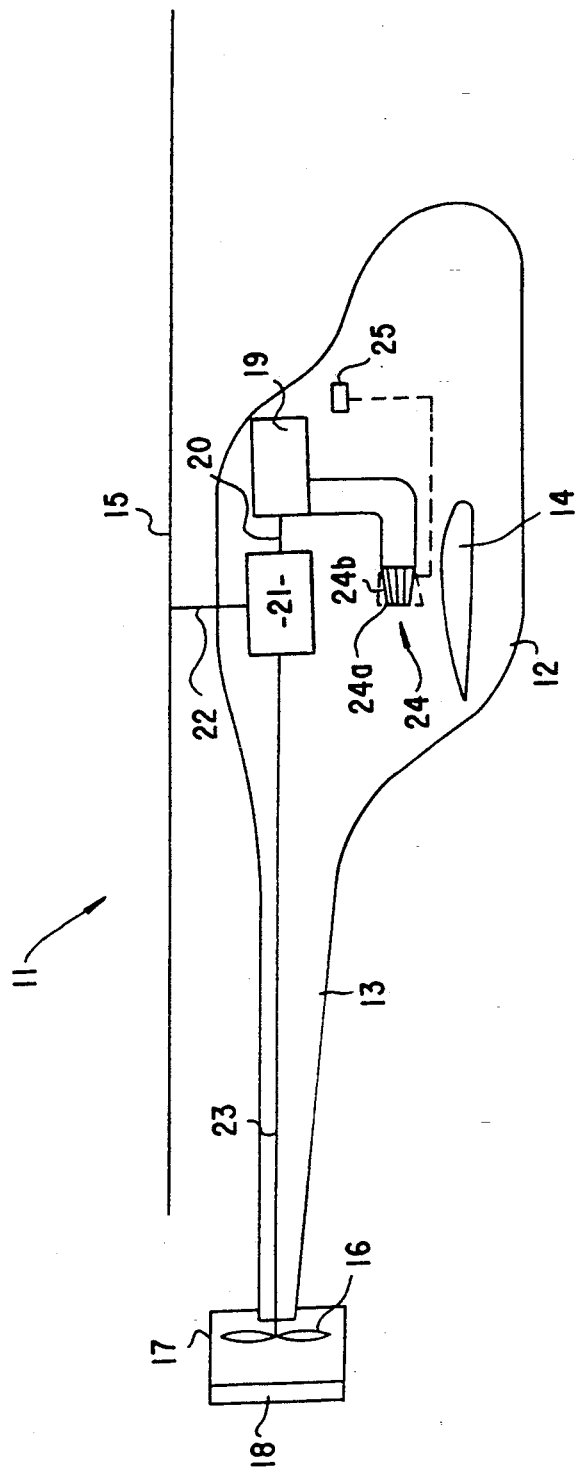

A compound helicopter 11 comprises a fuselage 12 having a rearwardly extending tail boom 13. A fixed wing 14 extends from both sides of the fuselage 12 and a main sustaining rotor 15 is located above the fuselage 12 for rotation about a generally vertical axis.

A rearwardly facing variable pitch propeller 16 is located at the end of tail boom 13 for rotation about a generally horizontal axis. The propeller 16 is located concentrically in a duct 17 which supports at its outlet a plurality of pivotally mounted vertical vanes 18.

At least one variable cycle gas turbine engine 19 is supported on the fuselage 12 with its power turbine connected through a drive shaft 20 to a gearbox 21. A vertical drive shaft 22 connects the gearbox 21 to drive the main sustaining rotor and a horizontal drive shaft 23 connects the gearbox 21 to drive the propeller 16.

Whilst propeller 16 is an efficient means of producing a propulsive thrust its size in such an arrangement is necessarily a compromise to satisfy stringent space, weight and centre of gravity considerations whilst providing a useful thrust. This is likely to result in a propeller 16 of a size which cannot absorb efficiently as much shaft power as that required to drive the main sustaining rotor and anti-torque means in hover and low speed flight.

The exhaust from the power turbine of engine 19 is ducted to atmosphere through a rearwardly facing variable area nozzle 24. For maximum efficiency it is desirable to operate the gas turbine engine 19 during normal modes of operation at a substantially constant speed to provide a substantially constant total power output comprised of a shaft power output for driving the sustaining rotor 15 and the propeller 16 through the gearbox 21 and a jet thrust output from the nozzle 24. Adjustment of the area of the variable area nozzle 24 provides control means for control of the split of the substantially constant total engine power output between the shaft power output and the jet thrust output.

The variable area exhaust nozzle 24 is adjusted by adjustment means 25 between a minimum area position shown in full line at 24a in FIG. 1 and a maximum area position shown in broken line at 24b.

Figure 2:
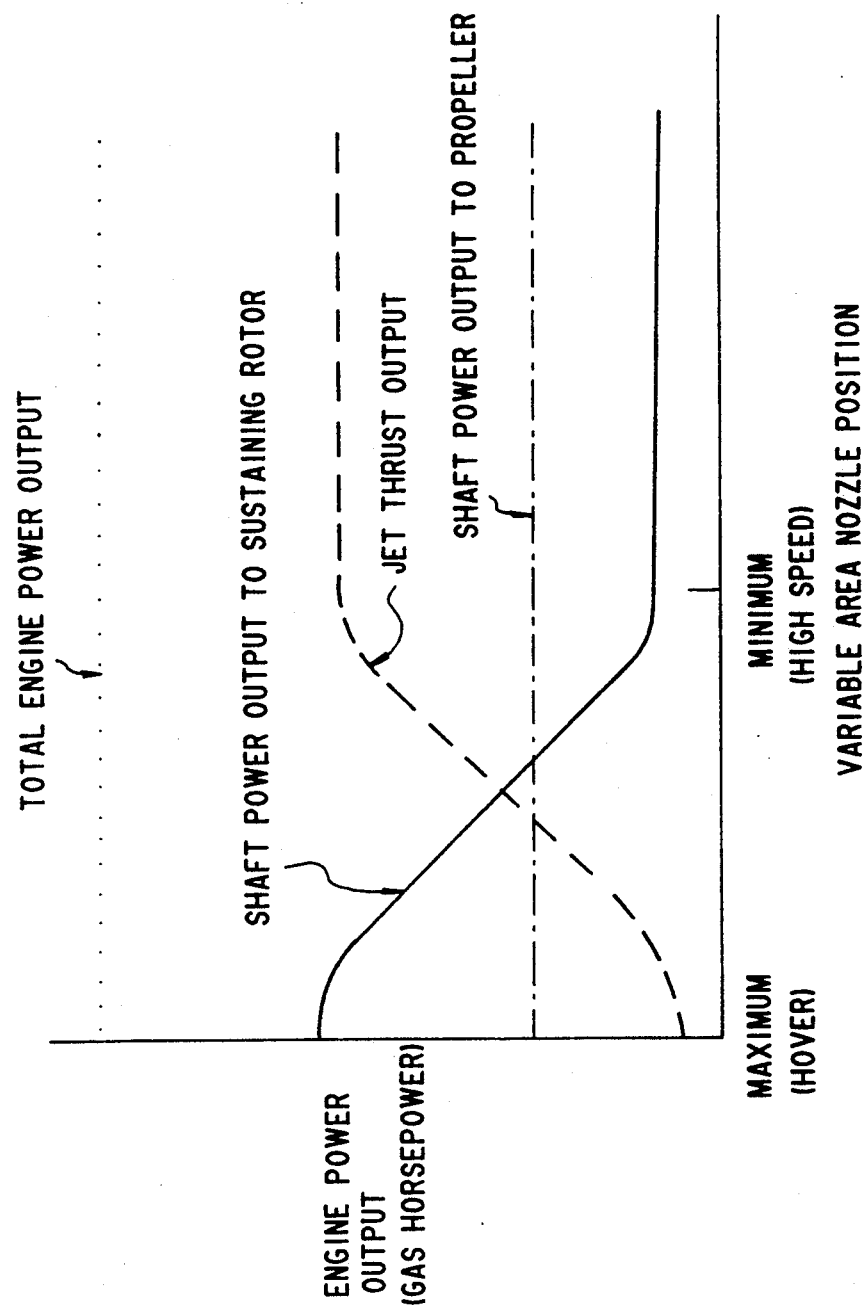
FIG. 2 is a diagram illustrating operational features of the invention.

Thus, in operation, engine 19 is operated at a substantially constant speed to provide a substantially constant total engine power output which is utilised in this invention in a controllable variable split between shaft power output to the gearbox 21 and jet thrust output from the variable area nozzle 24. The means for achieving the controllable variable split is by adjustment of the area of the variable area exhaust nozzle between the minimum area position 24a and the maximum area position 24b. Referring now to FIG. 2, in hover and low speed flight the engine 19 is operated at the design constant speed with the variable area nozzle 24 in its maximum area position 24b (FIG. 1) to maximise shaft power output for driving the main sustaining rotor 15 and the propeller 16 through gearbox 21, and very little jet thrust output is obtained from the nozzle 24. In this mode of operation the anti-torque force necessary to counteract main rotor torque and provide directional control is provided by the pivotally mounted vertical vanes 18 in the propeller slipstream.

It will be noted from FIG. 2 that with the nozzle in the maximum area position the sum of the shaft power output to the sustaining rotor (full line), the shaft power output to the propeller (chain dot line) and the jet thrust output (broken line) equals the total engine power output (dotted line).

As forward speed increases more of the required lift force is provided by the fixed wing 14, and the main rotor 15 is gradually trimmed until it is operating in or very near an autorotation state in which it absorbs little or no shaft power from engine 19. In practice it is preferable to maintain the sustaining rotor in a horizontal position during high speed flight which also permits a substantially horizontal fuselage attitude to be maintained both serving to minimise drag, so that a small amount of shaft power will be utilised by the sustaining rotor in that mode. Consequently virtually all of the available shaft power output from the engine would normally be diverted to drive the propeller 16. However it is inefficient to provide more shaft power to the propeller 16 than can be absorbed efficiently and the present invention provides for the maximum efficient utilisation of available engine power during high speed flight.

This is achieved by reducing the area of the variable area nozzle 24 to reduce the shaft power output of the power turbine of engine 19 to a level that is sufficient to drive the slowed sustaining rotor 15 and that which can be used efficiently by the propeller 16. In other words, since very little shaft power is being absorbed by the main sustaining rotor 15, the area of nozzle 24 is reduced towards the minimum area position until the shaft power output from the engine is substantially equal to that required by the propeller 16 for maximum efficiency.

By "substantially equal" in this context we mean that the shaft power output from the engine 19 during high speed forward flight is matched as closely as is possible within the constraints of the design characteristics of the engine and the overall operational requirements of the helicopter with the sum of that required to control the sustaining rotor and the maximum shaft power that can be absorbed efficiently by the propeller 16.

The described reduction in shaft power output by reducing the area of the variable area nozzle 24 to the minimum area position 24a results in the remaining engine power output capacity issuing as an increasing jet thrust output from the nozzle 24 as illustrated in FIG. 2 to provide a useful additional forward thrust so that virtually the whole of the available power output from the engine 19 is utilised efficiently in increasing the forward thrust on the helicopter.

The off-loading of the main sustaining rotor 15 pushes out the aerodynamic boundaries so that the restrictions to forward speed are encountered at a higher forward speed than is the case for compound helicopters in which the main rotor is continuously powered at maximum power. The elimination of the conventional anti-torque rotor enhances performance and the use of a propeller for forward propulsion represents the most efficient manner of utilising engine shaft power output in high speed forward flight. Operational efficiency in that mode is further enhanced due to the fact that the shaft power output from the engine is matched to that required for maximum propeller performance with the remainder of the engine power output capacity utilised as a jet thrust to enhance high speed performance.

These features are illustrated in FIG. 2 and it is important to note that with the jet nozzle 24 in the minimum area position for high speed forward flight, the sum of the shaft power output to the sustaining rotor, the shaft power output to the propeller and the jet thrust output is again equal to the total power output from the engine. This means that, unlike the prior art devices, the compound helicopter of this invention utilises all available engine power output in both modes of operation for maximum efficiency throughout the whole of its operating range and, except for the minimal shaft power required by the slowed rotor, all remaining available power output is usable in forward flight as shaft power by the propeller and as jet thrust from the nozzle to maximise the forward speed capability.

Furthermore, the invention permits the engine(s) to be operated continuously at its design speed to maximise the efficiency of the engine itself.

Looked at in another way the compound helicopter of this invention does not have to have power on board that cannot be used to advantage throughout the operating range and therefore does not have to carry engines with spare power output capacity. This further increases the overall efficiency of the compound helicopter of this invention compared to the prior art devices.

These operational advantages are achieved by the unique combination of features in a compound helicopter comprising the shaft powered sustaining rotor 15 and propeller 16, driven by a variable cycle gas turbine engine having a variable area exhaust nozzle 24 comprising the control means which provides for the selective control of the split of the constant engine power output between the shaft power output and the jet thrust output.

It will be understood that the vertical vanes 18 provide the necessary heading control in high speed forward flight.

The duct 17 increases the aerodynamic performance of the propeller 16 and improves the safety of the helicopter when compared to the use of conventional unprotected anti-torque rotors.

Another safety feature concerns the ability to land the helicopter in the event of a failure of the propeller 16 by reducing the shaft power output required by the main sustaining rotor 15 so that there is no anti-torque force requiring to be compensated. As previously described this is accomplished by trimming the main rotor and, by simultaneously reducing the area of the variable area nozzle 24 to maximise the jet thrust output from the nozzle, the helicopter is able to make a STOL landing in the manner of a conventional autogyro. This feature is enhanced by the aerodynamic cross sectional shape of the duct 17 which provides a control function, and some control would continue to be provided by the vanes 18.

Whilst one embodiment has been described and illustrated it will be understood that many modifications may be made without departing from the scope of the invention as defined in the appended claims. For example, one or more horizontal vanes may be provided in the slipstream of the propeller to provide pitch control of the helicopter to trim rotor flapping thereby reducing the cyclic control required at the main rotor and minimising fatigue loads in the main sustaining rotor. A variable diameter main sustaining rotor may be used to further enhance operational characteristics in both modes of operation. In a preferred embodiment two or more variable cycle gas turbine engines 19 would be provided each being connected by a drive shaft to the gearbox 21 and each having its turbine exhaust ducted to atmosphere through a variable area nozzle 24. The or each variable area nozzle 24 may be vectorable for example downwardly to provide an additional lift force or laterally to assist attitude control. Augmentor wing flaps may be provided on the wings and may be powered by air from the gas turbine engine to provide additional lift and thrust from the wing.

What is claimed is:

1. A method for operating a compound helicopter having a fuselage with a rearwardly extending tail boom, a fixed wing extending from both sides of the fuselage, a main sustaining rotor located above the fuselage for rotation about a generally vertical axis, a rearwardly facing variable pitch propeller located in a duct at the end of the tail boom for rotation about a generally horizontal axis, a plurality of pivotally mounted vertical vanes downstream of the propeller, at least one variable cycle gas turbine engine having a variable area exhaust nozzle through which the exhaust from a power turbine of the engine is ducted to atmosphere and adjusting means for adjusting the area of the exhaust nozzle between minimum and maximum area settings, comprising the steps of operating the engine at a substantially constant speed during both hover and high speed flight modes of operation to provide a substantially constant total power output comprising the combination of a shaft power output for driving the main sustaining rotor and the propeller through a gearbox together with a jet thrust output through the variable area exhaust nozzle, adjusting the area of the nozzle to substantially its maximum area position in hover and low speed flight so that the engine total power output comprises minimum jet thrust output from the exhaust nozzle and maximum shaft power output appropriate to drive the main sustaining rotor to provide lift and to drive the propeller to provide an anti-torque force, adjusting the area of the nozzle to substantially its minimum area position in high speed forward flight when the main sustaining rotor is unloaded and lift is provided by the wing so that the engine total power output comprises maximum jet thrust output from the variable area nozzle and a reduced shaft power output sufficient for control of the slowed main rotor and for efficient operation of the propeller in maximizing the propeller thrust force for maximum propulsion in high speed flight, whereby the total power output from the engine is substantially fully utilized in both modes of operation to maximize the efficiency of the compound helicopter.

* * * * *